United States Patent
Omikawa et al.

(10) Patent No.: US 11,814,099 B2
(45) Date of Patent: Nov. 14, 2023

(54) LANE DEPARTURE PREVENTION CONTROL APPARATUS

(71) Applicant: SUBARU CORPORATION, Tokyo (JP)

(72) Inventors: Takashi Omikawa, Tokyo (JP); Ryo Hajika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 138 days.

(21) Appl. No.: 17/459,755

(22) Filed: Aug. 27, 2021

(65) Prior Publication Data
US 2022/0063722 A1    Mar. 3, 2022

(30) Foreign Application Priority Data

Aug. 28, 2020   (JP) ................................. 2020-144270

(51) Int. Cl.
 *B62D 15/02*   (2006.01)
 *B62D 7/15*    (2006.01)
 (Continued)

(52) U.S. Cl.
 CPC ........... *B62D 15/025* (2013.01); *B60W 10/20* (2013.01); *B60W 30/12* (2013.01);
 (Continued)

(58) Field of Classification Search
 CPC ...... B62D 15/025; B62D 7/159; B62D 6/003; B62D 15/021; B60W 10/20; B60W 30/12;
 (Continued)

(56) References Cited

U.S. PATENT DOCUMENTS

| 6,092,619 A * | 7/2000 | Nishikawa ........... G05D 1/0246 |
| | | 180/204 |
| 2012/0029773 A1* | 2/2012 | Fujita ....................... B62D 6/00 |
| | | 701/41 |

(Continued)

FOREIGN PATENT DOCUMENTS

JP    2018-114806 A    7/2018

*Primary Examiner* — Sze-Hon Kong
(74) *Attorney, Agent, or Firm* — McDermott Will & Emery LLP

(57) ABSTRACT

A lane departure prevention control apparatus for a vehicle includes a traveling-environment recognition unit configured to detect lane lines, a steering-angle detector, a vehicle-behavior detector, a predicted departure determination unit, a lane departure prevention control processor, and a steering override determination unit. The predicted departure determination unit is configured to predict whether the vehicle is to depart from the lane. The lane departure prevention control processor is configured to set a target steering angle and execute a lane departure prevention control. The steering override determination unit is configured to check presence of steering override based on the driver's steering-wheel operation. The lane departure prevention control processor is configured to set the target steering angle in a direction to assist the steering-wheel operation in a case where the steering override is present and the target steering angle is in a steering-decrease direction relative to the actual steering angle.

3 Claims, 9 Drawing Sheets

(51) Int. Cl.
  *B60W 30/12* (2020.01)
  *B60W 10/20* (2006.01)
  *B60W 50/08* (2020.01)
  *B60W 50/00* (2006.01)

(52) U.S. Cl.
  CPC ........... *B60W 50/087* (2013.01); *B62D 7/159* (2013.01); *B60W 2050/0071* (2013.01); *B60W 2510/20* (2013.01); *B60W 2555/20* (2020.02); *B60W 2710/20* (2013.01)

(58) Field of Classification Search
  CPC ....... B60W 50/087; B60W 2050/0071; B60W 2510/20; B60W 2555/20; B60W 2710/20; B60W 50/0097; B60W 2540/18; B60W 2552/53; B60W 2710/207; B60W 2050/0073
  See application file for complete search history.

(56) References Cited

U.S. PATENT DOCUMENTS

| | | | |
|---|---|---|---|
| 2018/0178716 A1* | 6/2018 | Fujii | G08G 1/167 |
| 2018/0178802 A1* | 6/2018 | Miyata | B60W 50/14 |
| 2018/0201318 A1 | 7/2018 | Kataoka et al. | |
| 2019/0256104 A1* | 8/2019 | Shimizu | B60W 50/0098 |
| 2020/0247460 A1* | 8/2020 | Suzuki | B62D 6/00 |
| 2021/0179093 A1* | 6/2021 | Miyamoto | B60W 30/0956 |
| 2021/0245805 A1* | 8/2021 | Ishida | B62D 5/0484 |
| 2021/0371010 A1* | 12/2021 | Kojo | B62D 15/025 |
| 2022/0297756 A1* | 9/2022 | Caldwell | B62D 15/029 |
| 2022/0306113 A1* | 9/2022 | Raffone | B60W 60/0011 |

* cited by examiner

LANE DEPARTURE PREVENTION CONTROL APPARATUS

CROSS-REFERENCE TO RELATED APPLICATIONS

The present application claims priority from Japanese Patent Application No. 2020-144270 filed on Aug. 28, 2020, the entire contents of which are hereby incorporated by reference.

BACKGROUND

The technology relates to a lane departure prevention control apparatus.

A lane departure prevention control apparatus may first recognize a traveling lane of the own vehicle with use of a sensing device such as a camera mounted on the own vehicle. In a case where it is determined that a traveling direction of the own vehicle tends to depart from the traveling lane, the lane departure prevention control apparatus may control steering assist torque to so perform a steering control that the attitude of the own vehicle becomes parallel to a lane line. The lane departure prevention control apparatus thus helps to prevent departure of the own vehicle from the traveling lane. For example, reference may be made to Japanese Unexamined Application Publication (JP-A) No. 2018-114806.

SUMMARY

An aspect of the technology provides a lane departure prevention control apparatus to be applied to a vehicle. The lane departure prevention control apparatus includes a traveling-environment recognition unit, a steering-angle detector, a vehicle-behavior detector, a predicted departure determination unit, a lane departure prevention control processor, and a steering override determination unit. The traveling-environment recognition unit is configured to recognize a traveling environment in front of the vehicle. The traveling-environment recognition unit is configured to detect, on the basis of the recognized traveling environment, lane lines defining a left side and a right side of a lane on which the vehicle travels. The steering-angle detector is configured to detect an actual steering angle based on steering-wheel operation performed by a driver who drives the vehicle. The vehicle-behavior detector is configured to detect behavior of the vehicle. The predicted departure determination unit is configured to predict whether the vehicle is to depart from the lane on the basis of the lane lines defining the left side and the right side detected by the traveling-environment recognition unit and the behavior of the vehicle detected by the vehicle-behavior detector. The lane departure prevention control processor is configured to set, in a case where the predicted departure determination unit predicts that the vehicle is to depart from the lane, a target steering angle and execute a lane departure prevention control. The target steering angle is a steering angle with which departure of the vehicle from the lane is preventable. The steering override determination unit is configured to check, in a case where the lane departure prevention control processor sets the target steering angle, presence or absence of steering override based on the steering-wheel operation performed by the driver. The lane departure prevention control processor is configured to set the target steering angle in a direction to assist the steering-wheel operation performed by the driver in a case where the steering override determination unit detects the presence of the steering override and determines that the target steering angle is in a steering-decrease direction relative to the actual steering angle detected by the steering-angle detector.

An aspect of the technology provides a lane departure prevention control apparatus to be applied to a vehicle. The lane departure prevention control apparatus includes a traveling-environment recognition unit, a steering-angle detector, a vehicle-behavior detector, and circuitry. The traveling-environment recognition unit is configured to recognize a traveling environment in front of the vehicle. The traveling-environment recognition unit is configured to detect, on the basis of the recognized traveling environment, lane lines defining a left side and a right side of a lane on which the vehicle travels. The steering-angle detector is configured to detect an actual steering angle based on steering-wheel operation performed by a driver who drives the vehicle. The vehicle-behavior detector is configured to detect behavior of the vehicle. The circuitry is configured to predict whether the vehicle is to depart from the lane on the basis of the lane lines defining the left side and the right side detected by the traveling-environment recognition unit and the behavior of the vehicle detected by the vehicle-behavior detector. The circuitry is configured to set, in a case where the vehicle is predicted to depart from the lane, a target steering angle and execute a lane departure prevention control. The target steering angle is a steering angle with which departure of the vehicle from the lane is preventable. The circuitry is configured to check, in a case where the target steering angle is set, presence or absence of steering override based on the steering-wheel operation performed by the driver. The circuitry is configured to set the target steering angle in a direction to assist the steering-wheel operation performed by the driver in a case where the presence of the steering override is detected and the target steering angle is determined as being in a steering-decrease direction relative to the actual steering angle detected by the steering-angle detector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
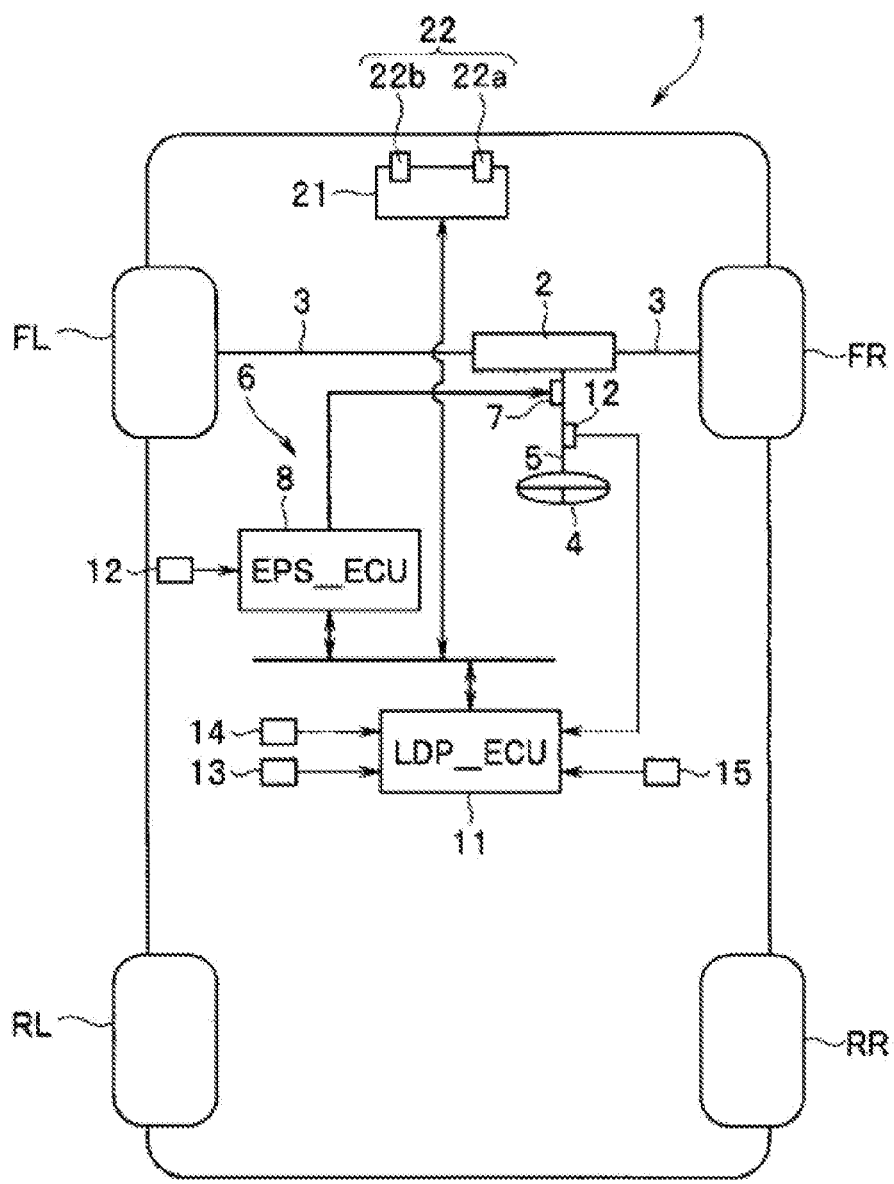
FIG. 1 is a diagram illustrating an example of a schematic configuration of a part of a vehicle on which a lane departure prevention control apparatus is to be mounted.

As steering assist torque, steering wheel torque is usually generated in a direction to assist steering-wheel operation performed by a driver. However, in a case where a lane departure prevention control is being performed, the steering wheel torque may be generated, as the steering assist torque, in a direction to suppress or prevent lane departure of the own vehicle.

In addition, the steering assist torque for the lane departure prevention control may be set to a relatively large value in order to be less influenced by disturbance. Therefore, even if the driver intentionally attempts to perform the steering-wheel operation in a direction opposite to the steering assist direction, i.e., in a lane departure direction, large reaction force may be applied to the steering-wheel operation performed by the driver. This may sometimes give the driver a sense of discomfort.

To address this, for example, JP-A No. 2018-114806 discloses a technique that, in a case where the driver intentionally performs the steering-wheel operation in the lane departure direction, steering assist torque applied to prevent lane departure is reduced to thereby reduce the sense of discomfort that the driver feels in performing the steering-wheel operation.

For example, in a case where the own vehicle travels on a curved road having a relatively short radius of curvature at a high speed, large lateral acceleration may be generated. The own vehicle may therefore easily depart from a lane line which defines a lane. Under such a circumstance, if the steering-wheel operation performed by the driver in the lane departure direction is detected and the steering assist torque applied to prevent lane departure is reduced, lane departure may be promoted.

Therefore, in such a circumstance, it may be favorable to maintain the steering assist torque even if it is against the intention of the driver.

Further, an existing lane departure prevention control is typically ended after the lane departure prevention control causes the attitude of the own vehicle to be substantially parallel to an inner side of the lane line present in the lane departure direction and steers the own vehicle slightly toward the middle of the lane.

However, in a case where the lane departure prevention control is ended at a relatively early timing after the attitude of the own vehicle becomes substantially parallel to the inner side of the lane line when the own vehicle is traveling on a curved road as described above, there is a possibility of re-departure. To address this, recently, the lane departure prevention control may be continued for a predetermined time period (about 8 seconds to 12 seconds) also after the attitude of the own vehicle becomes substantially parallel to the inner side of the lane line. Thus, the own vehicle may be caused to travel along the inner side of the lane line while the lane departure prevention control is continued. This helps to prevent re-departure.

In some cases, the driver may feel that such a lane departure prevention control of causing the own vehicle to continue to travel along the lane line is too long. As a result, the driver may perform steering override while the lane departure prevention control is being performed. The driver may perform such steering override to return the own vehicle toward the middle of the lane by performing steering-wheel operation by himself or herself.

Such steering override may guide the own vehicle in a direction opposite to the lane deviation direction. In such a case, a possibility of re-departure is low. However, for example, the technique disclosed in JP-A No. 2018-114806 maintains large steering assist torque that applies reaction force to the steering-wheel operation performed by the driver. This may give the driver a sense of discomfort.

It is desirable to provide a lane departure prevention control apparatus that allows for steering-wheel operation that gives less or no sense of discomfort to a driver in a case where the driver performs steering override in a direction opposite to a lane departure direction while a lane departure prevention control is continued.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Referring to FIG. 1, a vehicle (an own vehicle) 1 may include a left-front wheel FL, a right-front wheel FR, a left-rear wheel RL, and a right-rear wheel RR. The left-front wheel FL and the right-front wheel FR may be both coupled to a steering mechanism 2 such as a rack-and-pinion mechanism via respective tie rods 3. Further, coupled to the steering mechanism 2 may be a steering shaft 5. The steering shaft 5 may have a tip to which a steering wheel 4 is fixed. When a driver operates the steering wheel 4, the left-front wheel FL and the right-front wheel FR may be turned via the steering mechanism 2.

Further, coupled to the steering shaft 5 via an unillustrated transmission mechanism may be an electric power steering (EPS) motor 7 of an EPS device 6. The EPS device 6 may include the EPS motor 7 and an EPS control unit (EPS_ECU) 8.

The EPS_ECU 8 may control steering wheel torque that the EPS motor 7 applies to the steering shaft 5. That is, the EPS_ECU 8 may set torque (steering assist torque) to assist steering based on operation performed on the steering wheel 4 by the driver in accordance with factors including, without limitation, steering wheel torque detected by a steering-wheel-torque sensor 12 which will be described later, and a vehicle speed detected by a vehicle-speed sensor 13 which will be described later. Applying the steering assist torque to the steering shaft 5 may reduce a load on the driver performing the steering-wheel operation.

Further, the EPS_ECU 8 may be coupled to a lane departure prevention control apparatus (LDP_ECU) 11 via an in-vehicle communication network using communication such as controller area network (CAN) communication in a mutually communicable manner. The EPS_ECU 8 and the LDP_ECU 11 may each include a well-known integrated circuit provided with devices including, without limitation, a control processing unit (CPU), a random-access memory (RAM), a read-only memory (ROM), and a non-volatile storage, and their peripherals. The ROM may be caused to hold in advance a program to be executed by the CPU, fixed data such as a table or a map, and any other suitable information.

In the lane departure prevention control, a command signal corresponding to the steering wheel torque set by the LDP_ECU 11 may be supplied to the EPS_ECU 8. The EPS_ECU 8 may cause the EPS motor 7 to generate a predetermined amount of steering assist torque, thereby controlling the own vehicle 1 to travel along the inner side of the lane line present in the lane departure direction to help to prevent departure of the own vehicle 1 from the lane. Thereafter, departure of the own vehicle 1 from the lane may be prevented. Hereinafter, the departure of the own vehicle 1 from the lane is sometimes referred to as "lane departure" for convenience. Here, "the departure of the own vehicle 1 from the lane" may mean that at least a part of the own vehicle 1 locates outside of the lane on which the vehicle 1 travels when viewed from above vertically. The lane on which the vehicle 1 travels is sometimes referred to as a "traveling lane" for convenience. The traveling lane is a region between a left lane line and a right lane line. A left-side edge of the traveling lane is defined by the inner edge of the left lane line. A right-side edge of the traveling lane is defined by the inner edge of the right lane line.

Although not illustrated, units that control a traveling state of the own vehicle 1 may be coupled to the in-vehicle communication network in a mutually communicable manner in addition to the EPS_ECU 8 and the LDP_ECU 11. Such units may include, for example, a driving-source control unit that controls output of a drive source such as an engine or an electric motor for traveling, a transmission control unit, and a braking control unit.

In addition, coupled to the LDP_ECU 11 may be sensors configured to detect behavior of the own vehicle 1. Such sensors may include, for example, the steering-wheel-torque sensor 12, the vehicle-speed sensor 13, a yaw-rate sensor 14, and a steering-angle sensor 15. In one embodiment, such sensors may serve as a "vehicle-behavior detector". The steering-wheel-torque sensor 12 may be attached to the steering shaft 5, and detect steering wheel torque generated by operation performed on the steering wheel 4 by the driver. The vehicle-speed sensor 13 may detect a vehicle speed. The yaw-rate sensor 14 may detect a yaw rate and lateral acceleration generated at the vehicle body. The steering-angle sensor 15 may detect an actual steering angle θst generated by the steering-wheel operation performed by the driver, on the basis of a rotational angle of the steering shaft 5. In one embodiment, the steering-angle sensor 15 may serve as a "steering-angle detector". The data of the steering wheel torque detected by the steering-wheel-torque sensor 12 and the vehicle speed detected by the vehicle-speed sensor 13 may be also supplied to a lane recognition unit 24 which will be described later. The steering wheel torque detected by the steering-wheel-torque sensor 12 and the actual steering angle θst detected by the steering-angle sensor 15 may be detected as positive (+) for turning left and negative (−) for turning right in the example embodiment.

Figure 2:
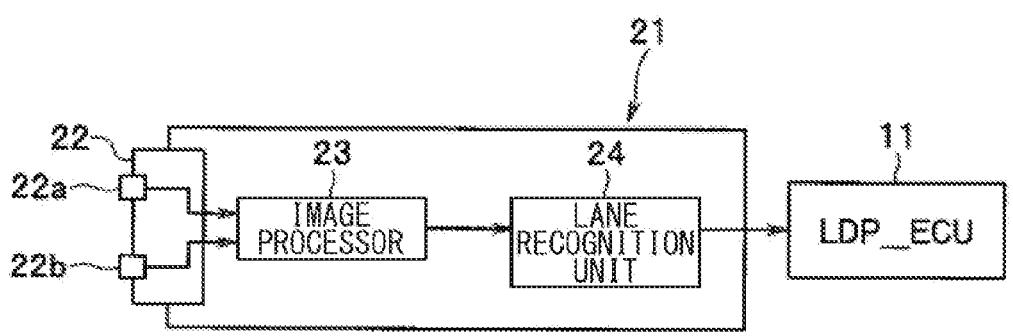
FIG. 2 is a block diagram illustrating an example of a configuration of a camera unit.

The vehicle (the own vehicle) 1 may further include a camera unit 21. In one embodiment, the camera unit 21 may serve as a "traveling-environment recognition unit". Referring to FIG. 2, the camera unit 21 may include an on-vehicle camera 22, an image processor 23, and the lane recognition unit 24 that are built therein. The on-vehicle camera 22 may include a stereo camera including a main camera 22a and a subsidiary camera 22b. The main camera 22a and the subsidiary camera 22b may be disposed, for example, at respective positions that are above an inside rear view mirror provided in the front part inside the vehicle and that are near a windshield. The main camera 22a and the subsidiary camera 22b may be disposed horizontally on the left side and the right side on the middle in a vehicle-width direction at the same or similar distance from the middle in the vehicle-width direction. The main camera 22a and the subsidiary camera 22b may each include a color imaging device such as a color camera provided with a color charge-coupled device (CCD) or a color complementary metal oxide semiconductor (CMOS). These two color imaging devices may be used to capture a three-dimensional color image of a traveling environment in front of the own vehicle 1 in a traveling direction. Such a traveling environment may include, for example but not limited to, the lane (the traveling lane) on which the own vehicle 1 is traveling and the left and right lane lines that define the lane.

The image processor 23 may convert a pair of analog images captured by the main camera 22a and the subsidiary camera 22b into digital images having predetermined luminance gradation. The image processor 23 may thus generate reference image data on the basis of an output signal from the main camera 22a and comparative image data on the basis of an output signal from the subsidiary camera 22b. Further, the image processor 23 may calculate distance data of the same object in the two images on the basis of a parallax between the generated reference image data and the generated comparative image data. The distance data may be a distance from the own vehicle 1 to the object.

The lane recognition unit 24 may include an integrated circuit. The lane recognition unit 24 may set, on a virtual road plane, the lane lines defining the left side and the right side of the traveling lane. The virtual road plane may be generated on the basis of the reference image data and the comparative image data received from the image processor 23. The lane lines may be recognized by a method such as pattern matching. Further, the lane recognition unit 24 may determine a distance (a lane width) from the inner edge of the left lane line to the inner edge of the right lane line on the basis of the distance data. The lane recognition unit 24 may supply these pieces of data to the LDP_ECU 11 as lane recognition information.

Figure 3:
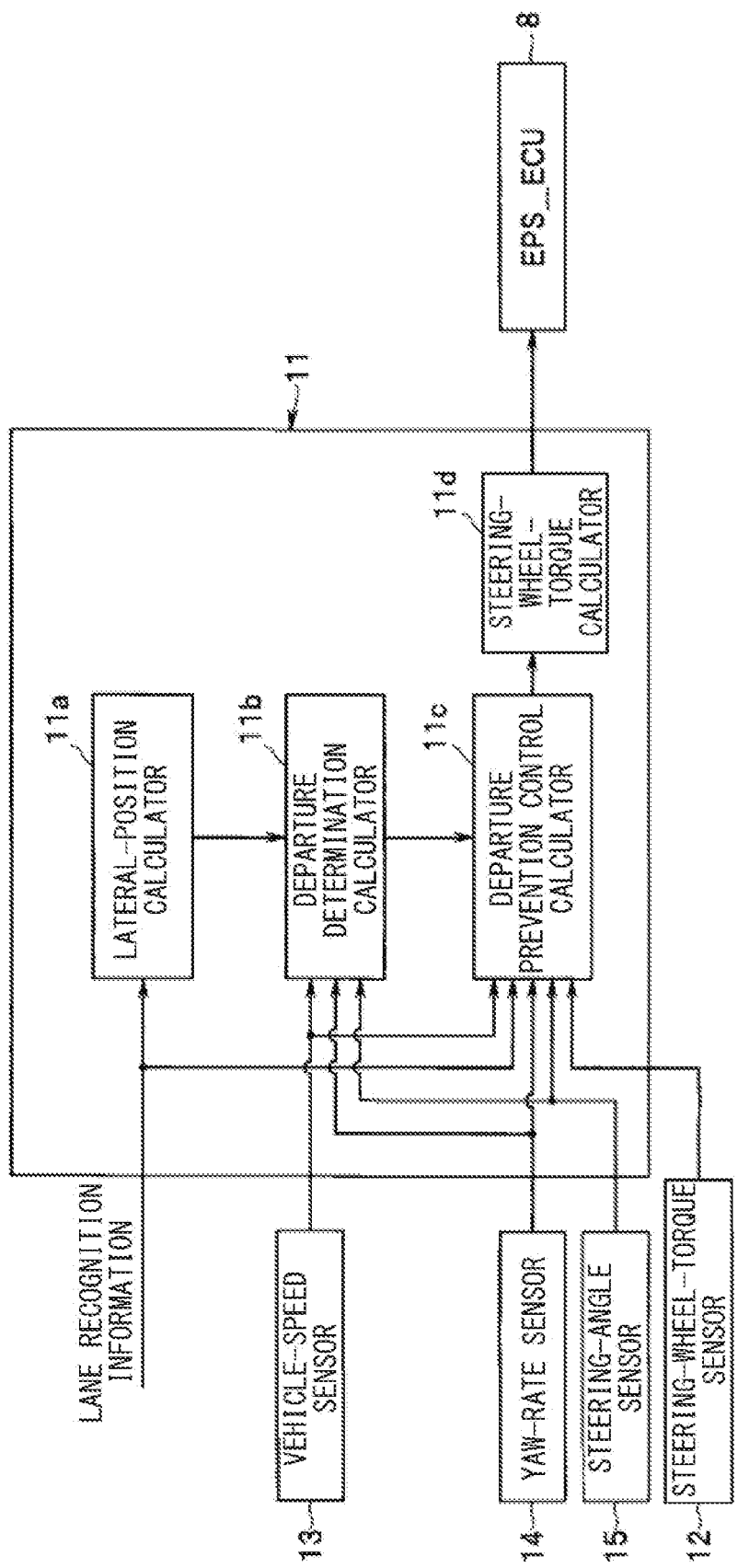
FIG. 3 is a block diagram illustrating an example of a configuration of the lane departure prevention control apparatus.

Referring to FIG. 3, the LDP_ECU 11 may include, as a configuration to control lane departure prevention, a lateral-position calculator 11a, a departure determination calculator lib, a departure prevention control calculator 11c, and a steering-wheel-torque calculator 11d.

The lateral-position calculator 11a may determine, on the basis of the lane recognition information received from the lane recognition unit 24, a lateral position of the middle of the own vehicle 1 in a vehicle-width Wm direction with respect to an inner edge of one of the left and right lane lines. In one example, the lateral position may be determined using the middle of the inner edges of the left and right lane lines as a reference.

The departure determination calculator lib may predict over-time variation in lateral position of the own vehicle 1 on the basis of the lateral position determined by the lateral-position calculator 11a, to thereby determine a predicted lateral movement amount which is a future movement amount in the lateral direction. In a case where it is predicted that there is a possibility that the predicted lateral movement amount causes departure from the lane (a region between the lane lines), the departure prevention control calculator 11c may set a target traveling path in accordance with a departure prevention control pattern which is set in advance. The target traveling path may allow for avoidance of the lane departure. Further, the departure prevention control calculator 11c may determine a target steering angle on the basis of the set target traveling path.

The steering-wheel-torque calculator 11d may set steering wheel torque (a control amount) corresponding to the steering angle signal received from the departure prevention control calculator 11c. The steering-wheel-torque calculator 11d may supply the data of the set steering wheel torque to the EPS_ECU 8. The EPS_ECU 8 may drive the EPS motor 7 on the basis of the data of the steering wheel torque received from the LDP_ECU 11 to thereby generate predetermined steering assist torque. As a result, in a case where it is determined that there is a possibility that a predicted traveling path indicated by a one-dot chain line in FIG. 7 causes lane departure accordingly, the own vehicle 1 may be caused to travel along the target traveling path indicated by a solid line in FIG. 7. The predicted traveling path may correspond to an over-time locus of predicted lateral movement amount. It is thus possible to avoid lane departure.

In one embodiment, the departure determination calculator lib may serve as a "predicted departure determination unit". The above-described determination process of predicting the lane departure performed by the departure determination calculator 11b may be executed, for example, in accordance with a lane departure determination routine illustrated in FIG. 4. In one embodiment, the process in the lane departure determination routine may serve as a process to be performed by the "predicted departure determination unit".

Figure 4:
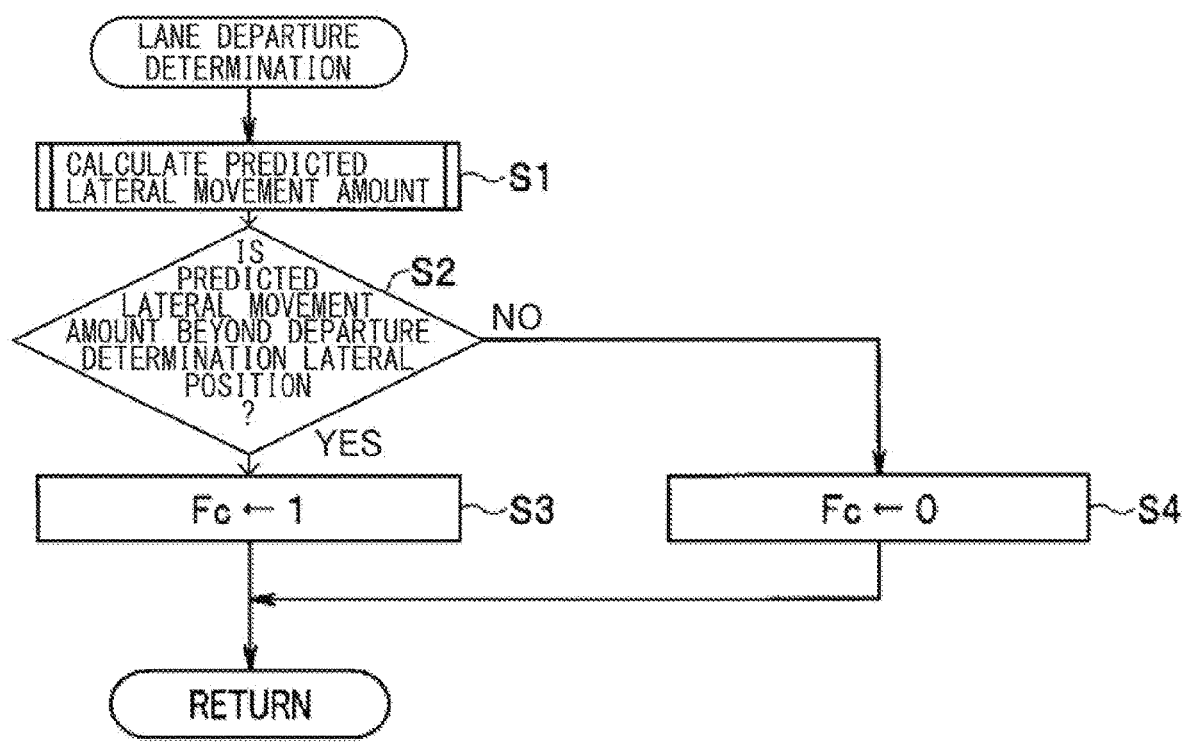
FIG. 4 is a flowchart illustrating an example of a lane departure determination routine.

In the lane departure determination routine illustrated in FIG. 4, first, in step S1, the departure determination calculator 11b may predict over-time variation in lateral position of the own vehicle 1 on the basis of the vehicle speed detected by the vehicle-speed sensor 13 and the steering angle detected by the steering-angle sensor 15, or on the basis of the yaw rate detected by the yaw-rate sensor 14, to thereby determine the predicted lateral movement amount.

Figure 7:
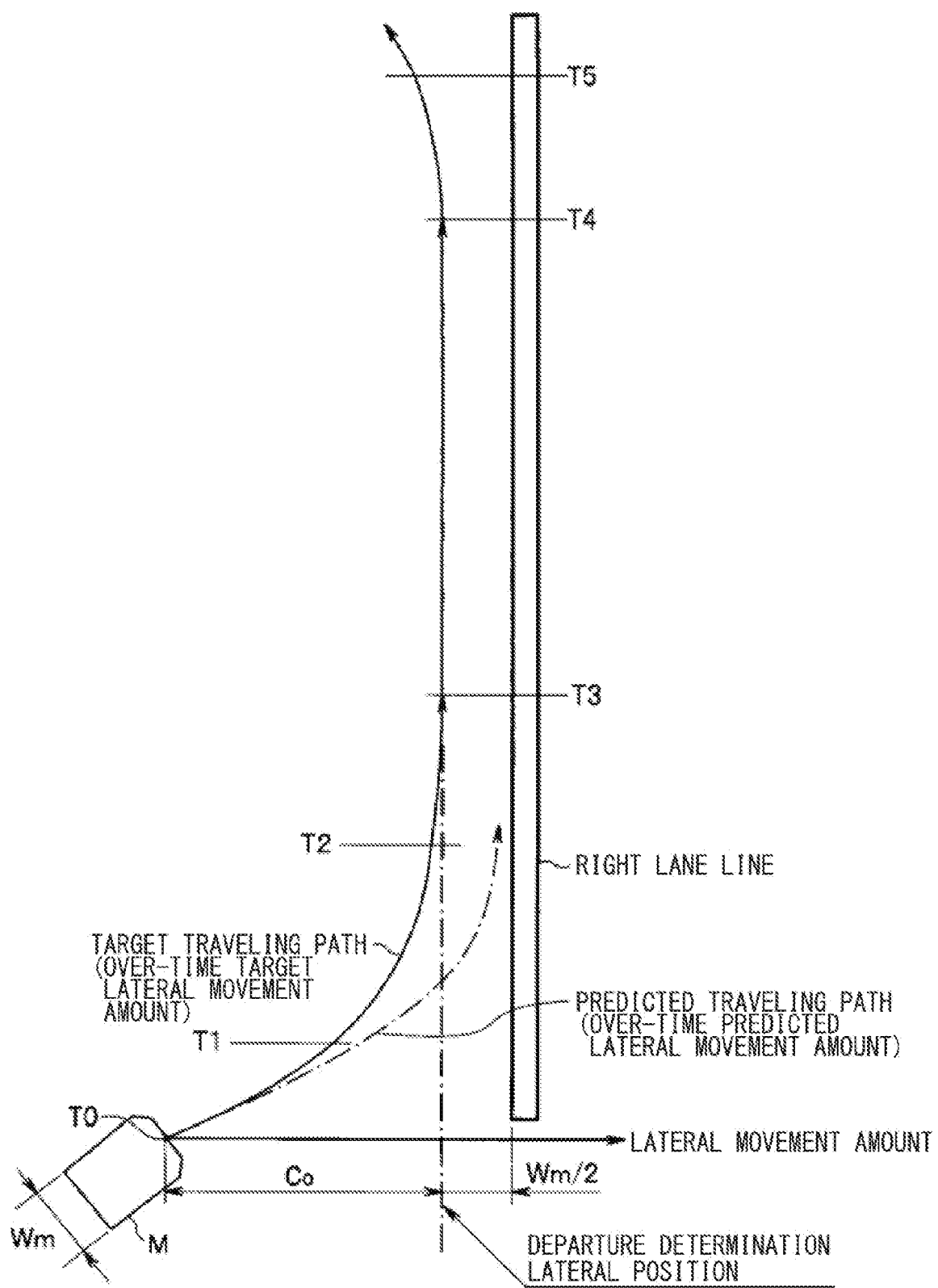
FIG. 7 is an explanatory diagram illustrating an example of a target traveling path based on the lane departure prevention control.

Thereafter, the process may be caused to proceed to step S2. In step S2, the departure determination calculator 11b may check whether the predicted lateral movement amount is beyond the departure determination lateral position. As illustrated in FIG. 7, the departure determination lateral position may be set at a position that is on the inner side of the inner edge of the lane line by ½ of the vehicle width Wm, according to the example embodiment. Further, the lateral position of the own vehicle 1 with respect to the departure determination lateral position may be set using the middle of the own vehicle 1 in the vehicle width Wm direction as a reference. Therefore, in a case where the predicted lateral movement amount of the own vehicle 1 is beyond the departure determination lateral position, the own vehicle 1 is to depart from the lane.

In a case where it is predicted that the predicted lateral movement amount is beyond the departure determination lateral position (YES in step S2), the process may be caused to proceed to step S3. In step S3, the departure determination calculator 11b may set a departure prevention control flag Fc (Fc←1) and exit the routine. In a case where it is predicted that the predicted lateral movement amount is not beyond the departure determination lateral position (NO in step S2), the process may be branched to step S4. In step S4, the departure determination calculator 11b may clear the departure prevention control flag Fc (Fc←0) and exit the routine.

The value of the departure prevention control flag Fc may be read by the departure prevention control calculator 11c. In one embodiment, the departure prevention control calculator 11c may serve as a "lane departure prevention control processor". The lane departure prevention control to be performed by the departure prevention control calculator 11c may be executed, for example, in accordance with a lane departure prevention control routine illustrated in FIG. 5. In one embodiment, the process in the lane departure prevention control routine may serve as a process to be performed by the "lane departure prevention control processor".

Figure 5:
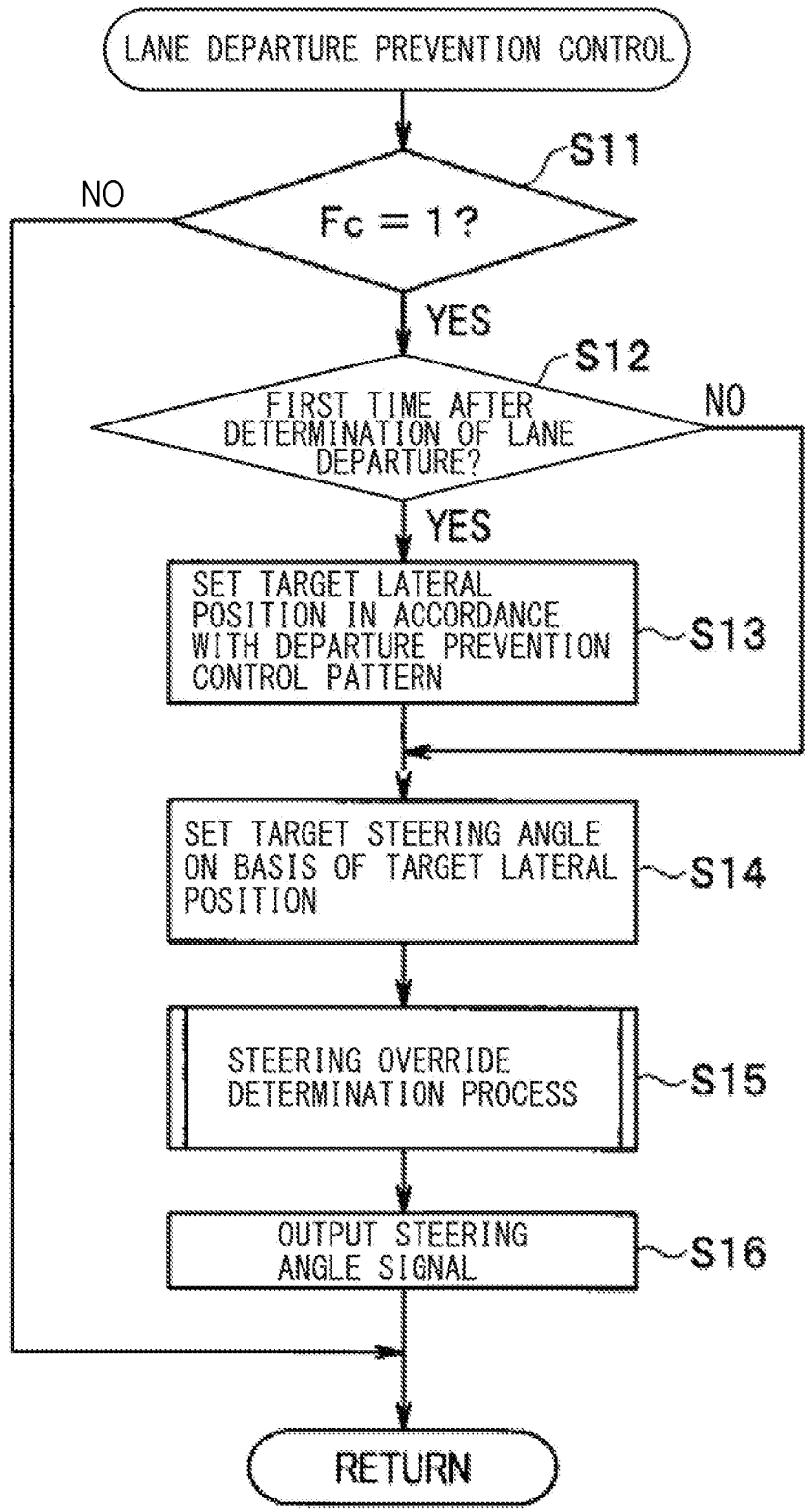
FIG. 5 is a flowchart illustrating an example of a lane departure prevention control routine.

In the lane departure prevention control routine illustrated in FIG. 5, first, in step S11, the departure prevention control calculator 11c may check the value of the departure prevention control flag Fc. In a case where Fc=1 (YES in step S11), the departure prevention control calculator 11c may determine that the predicted lateral movement amount of the own vehicle 1 is beyond the departure determination lateral position, and the process may be caused to proceed to step S12. In a case where Fc=0 (NO in step S11), the departure prevention control calculator 11c may determine that the predicted lateral movement amount is on the inner side of the departure determination lateral position, i.e., that the predicted lateral movement amount is not beyond the departure determination lateral position, and may exit the routine. Accordingly, in the case where Fc=0 (NO in step S11), if the active lane keep (ALK) unit is mounted on the own vehicle 1, the ALK unit may determine the middle (the middle of the lane) between the left and the right lane lines on the basis of the left and the right lane lines recognized by the lane recognition unit 24 of the camera unit 21. Further, the ALK unit may execute an active lane keep control that allows the own vehicle 1 to travel in the middle of the lane.

In a case where the ALK unit is not mounted on the own vehicle 1, or in a case where the ALK unit is turned off, the EPS_ECU 8 may determine the steering wheel torque corresponding to the operation performed on the steering wheel 4 by the driver, i.e., the steering-wheel operation performed by the driver. Further, the EPS_ECU 8 may drive the EPS motor 7 to generate the determined steering wheel torque to assist the steering-wheel operation performed by the driver.

In step S12, the departure prevention control calculator 11c may check whether it is the first time to perform the routine after it is determined that there is a possibility of lane departure. For example, the departure prevention control calculator 11c may check the above by checking whether it is the first time to perform the routine after the value of the departure prevention control flag Fc is changed from 0 (zero) to 1.

In a case where it is the first time to perform the routine after it is determined that there is a possibility of lane departure (YES in step S12), the process may be caused to proceed to step S13. In step S13, the departure prevention control calculator 11c may set a target lateral position for each calculation cycle in accordance with the departure prevention control pattern. Thereafter, the process may be caused to proceed to step S14.

Figure 8:
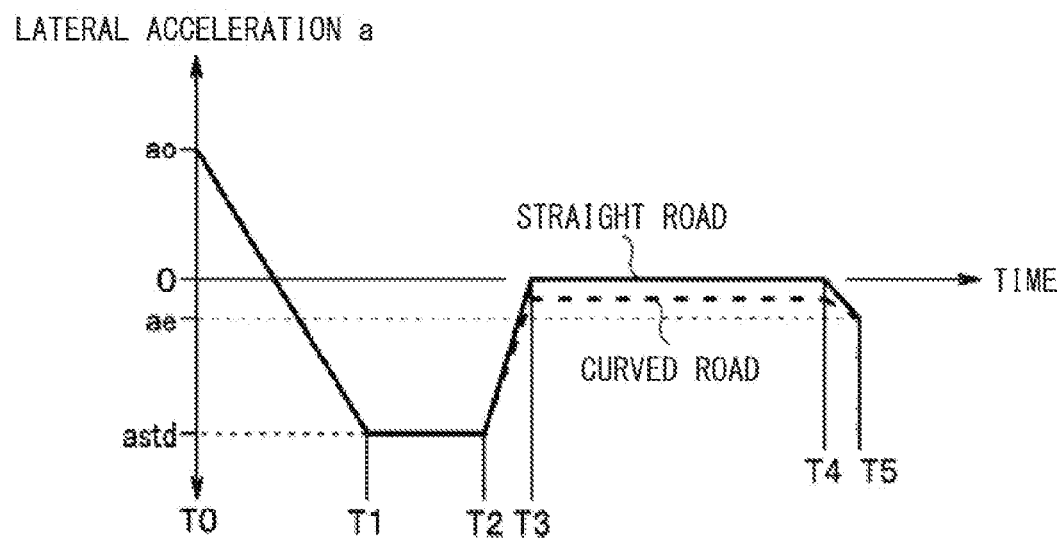
FIG. 8 is a time chart illustrating an example of a departure prevention control pattern based on lateral acceleration.

The departure prevention control pattern is briefly described below with reference to FIG. 8. In FIG. 8, "ao" may represent initial lateral acceleration at a time when the departure determination calculator lib predicts that there is a possibility of lane departure, "astd" may represent control standard lateral acceleration at a time when the own vehicle 1 is caused to turn while the lateral acceleration is kept constant (lateral acceleration≠0), and "ae" may represent lateral acceleration at a time when the lane departure prevention control is ended.

The control of the lateral acceleration based on the departure prevention control pattern is described below by applying the control to the target traveling path illustrated in FIG. 7. First, the departure prevention control calculator 11c may determine a control start lateral position Co from the departure determination lateral position at a time when the departure determination calculator 11b predicts that there is a possibility of lane departure. The departure prevention control calculator 11c may start the lane departure prevention control from the determined control start lateral position Co (elapsed time T0). Further, the departure prevention control calculator 11c may cause steering to be performed in the steering-increase direction to thereby decrease the lateral acceleration from the initial lateral acceleration ao at the start of the lane departure prevention control to the control standard lateral acceleration astd with use of a control start jerk set in advance. The initial lateral acceleration ao may be determined by multiplying the yaw rate detected by the yaw-rate sensor 14, by the vehicle speed detected by the vehicle-speed sensor 13. In one example, the initial lateral acceleration ao may be set by estimating the lateral acceleration with respect to the current steering angle on the basis of a vehicle model based on a result of measurement of lateral acceleration in a case where the own vehicle 1 performs steady-state cornering with a constant steering angle.

When the lateral acceleration reaches the control standard lateral acceleration astd (elapsed time T1), the departure prevention control calculator 11c may cause the own vehicle 1 to turn with a constant steering angle (from elapsed time T1 to elapsed time T2). Thereafter, the departure prevention control calculator 11c may cause the steering to be performed in the steering-decrease direction with use of a steering-decrease jerk before the own vehicle 1 reaches the departure determination lateral position, thereby causing the own vehicle 1 to travel along the departure determination lateral position for a predetermined time period (about 8 seconds to 12 seconds) (from elapsed time T3 to elapsed time T4). The steering-decrease jerk may be set in advance. In an existing technique, the own vehicle 1 is caused to return to the middle of the lane and the lane departure prevention control is ended immediately thereafter. However, according to the example embodiment, the own vehicle 1 may be caused to travel along the departure determination lateral position for a predetermined time period as for a period from the elapsed time T3 to the elapsed time T4. As a result, for example, it is possible to help to prevent re-departure while the own vehicle 1 is traveling on a curved road.

Figure 10:
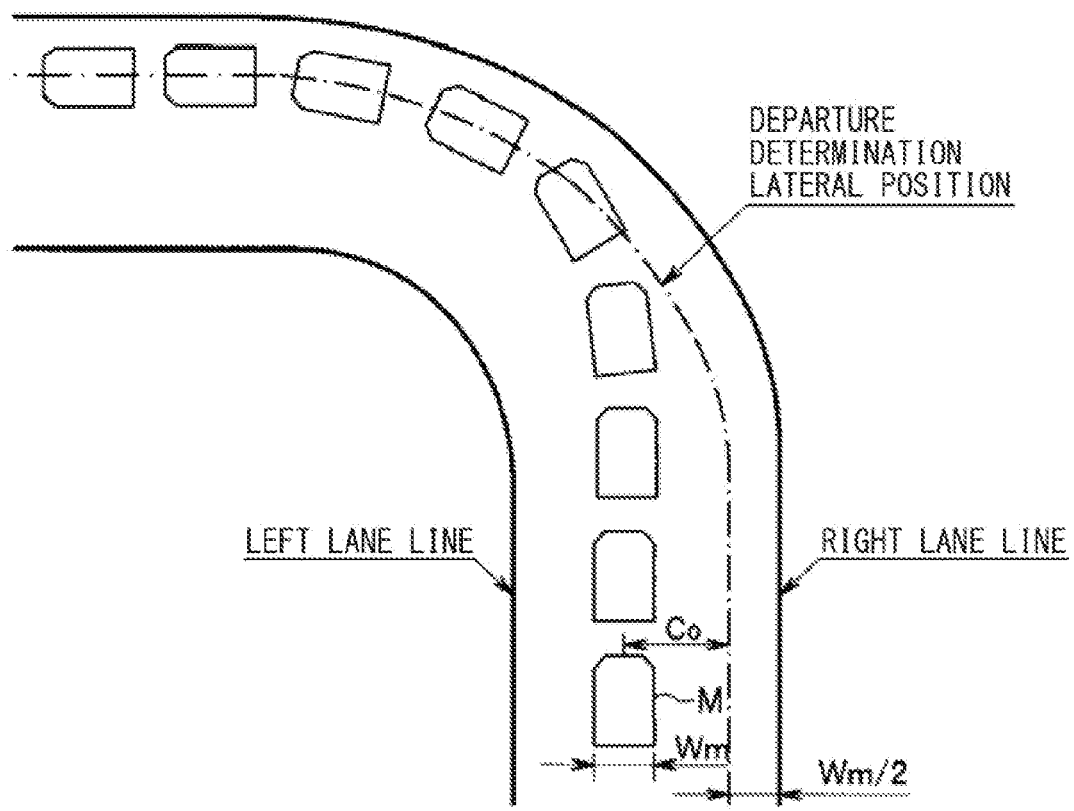
FIG. 10 is an explanatory diagram illustrating an example of the lane departure prevention control in a case where the own vehicle is traveling on a curved road.

Note that, as the control illustrated in FIG. 7 is a departure prevention control in a case where the own vehicle 1 is traveling on a straight road, the lateral acceleration "a" in a period from the elapsed time T3 to the elapsed time T4 may be substantially 0 (zero). In contrast, as illustrated in FIG. 10, in a departure prevention control in a case where the own vehicle 1 is traveling on a curved road, the departure determination lateral position may be set along the curved road. Therefore, the own vehicle 1 may turn with predetermined lateral acceleration in a period from the elapsed time T3 to the elapsed time T4 as illustrated in a dashed line in FIG. 8.

Thereafter, the departure prevention control calculator 11c may cause the steering to be performed slightly in the steering-increase direction to guide the own vehicle 1 in a direction opposite to lane departure, i.e. in the lane returning direction. When the lateral acceleration reaches the end lateral acceleration ae, the departure prevention control calculator 11c may end the lane departure prevention control.

In a case where it is the second or more time to perform the routine after it is determined that there is a possibility of lane departure (NO in step S12), the process may be caused to jump to step S14.

When the process is caused to proceed from step S12 or step S13 to step S14, the departure prevention control calculator 11c may set a target steering angle Go on the basis of the target lateral position. That is, for a period from the elapsed time T0 to the elapsed time T1 in the departure prevention control pattern illustrated in FIG. 8, the departure prevention control calculator 11c may set the target steering angle θo that is to cause the lateral acceleration to reach the control standard lateral acceleration astd in accordance with the steering-increase jerk set on the basis of the target lateral position. In a time period from the elapsed time T1 to the elapsed time T2, the departure prevention control calculator 11c may set a constant target steering angle θo that maintains the lateral acceleration at the control standard lateral acceleration astd.

Further, in a period from the elapsed time T2 to the elapsed time T3, the departure prevention control calculator 11c may set the target steering angle θo with which the own vehicle 1 is guided to the departure determination lateral position. In a period from the elapsed time T3 to the elapsed time T4, the departure prevention control calculator 11c may set the target steering angle θo with which the own vehicle 1 is caused to travel along the departure determination lateral position. In a period from the elapsed time T4 to the elapsed time T5, the departure prevention control calculator 11c may set the target steering angle θo with which the own vehicle 1 is caused to return in the lane returning direction (i.e., a direction opposite to the lane departure direction).

After setting the target steering angle θo based on the departure prevention control pattern in step S14, the process may be caused to proceed to step S15. In step S15, the departure prevention control calculator 11c may execute a steering override determination process, and the process may be caused to proceed to step S16. The steering override determination process may be executed in accordance with a steering override determination subroutine illustrated in FIG. 6. In one embodiment, the departure prevention control calculator 11c may serve as a "steering override determination unit". In one embodiment, the process in the steering override determination subroutine illustrated in FIG. 6 may serve as a process to be performed by the steering override determination unit.

Figure 6:
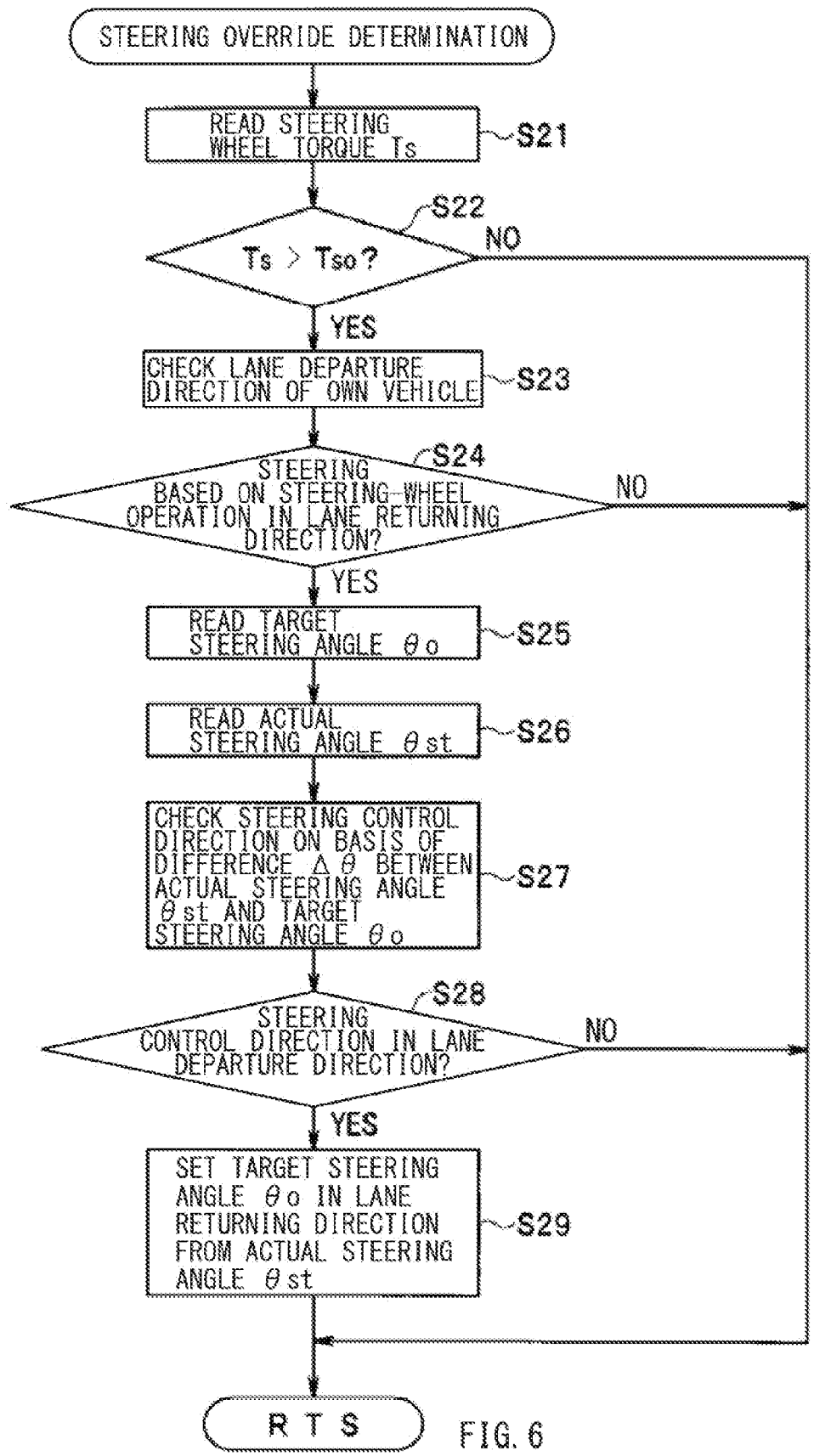
FIG. 6 is a flowchart illustrating an example of a steering override determination subroutine.

In the steering override determination subroutine illustrated in FIG. 6, first, in step S21, the departure prevention control calculator 11c may read the steering wheel torque Ts detected by the steering-wheel-torque sensor 12. Thereafter, in step 22, the departure prevention control calculator 11c may compare the read steering wheel torque Ts with an override determination threshold Tso. In a case where Ts≥Tso (YES in step S22), the departure prevention control calculator 11c may determine that the steering override is present, and the process may be caused to proceed to step S23. The steering override may be operation performed intentionally on the steering wheel 4 by the driver. In a case where Ts<Tso (NO in step S22), the departure prevention control calculator 11c may exit the routine, and the process may be caused to proceed to step S16 in FIG. 5. Note that the override determination threshold Tso may be set to a value at which it is allowed to certainly determine that the driver is holding the steering wheel 4, taking into consideration a factor such as a sensor offset or sensor variation resulting from a change in road surface.

In step S23, the departure prevention control calculator 11c may check the lane departure direction of the own vehicle 1 on the basis of the direction of the predicted lateral movement amount determined in step S1. Thereafter, in step S24, the departure prevention control calculator 11c may check whether the steering based on the operation performed on the steering wheel 4 by the driver is in the lane departure direction or the lane returning direction. The direction of the steering based on the operation performed on the steering wheel 4 by the driver may be checked on the basis of a direction (positive or negative) of generation of the steering wheel torque Ts detected by the steering-wheel-torque sensor 12.

Further, the departure prevention control calculator 11c may check whether the direction of such steering matches the lane departure direction. In a case where it is determined, on the basis of a result of the checking described above, that the direction of the predicted lateral movement amount matches the direction of the steering based on the operation performed on the steering wheel 4, the departure prevention control calculator 11c may determine that the driver is operating the steering wheel 4 to intentionally perform steering in the lane departure direction (NO in step S24), and exit the routine. Thereafter, the process may be caused to proceed to step S16 in FIG. 5. Accordingly, the steering assist torque to prevent the lane departure may be maintained as it is. In contrast, in a case where the direction of the predicted lateral movement amount does not match the direction of the steering based on the operation performed on the steering wheel 4, the departure prevention control calculator 11c may determine that the driver is operating the steering wheel 4 to intentionally perform steering in the lane returning direction (YES in step S24), and the process may be caused to proceed to step S25.

In step S25, the departure prevention control calculator 11c may read the set target steering angle θo. Thereafter, in step S26, the departure prevention control calculator 11c may read an actual steering angle θst that is detected by the steering-angle sensor 15 and taking into consideration the steering-wheel operation performed by the driver. Thereafter, in step S27, the departure prevention control calculator 11c may determine a difference Δθ between the actual steering angle θst and the target steering angle θo (Δθ=θst−θo). Further, the departure prevention control calculator 11c may check the direction of the steering control with the target steering angle θo relative to the actual steering angle θst generated by the steering-wheel operation performed by the driver on the basis of the difference Δθ.

Thereafter, in step S28, the departure prevention control calculator 11c may check whether the direction of the steering control based on the target steering angle θo relative to the actual steering angle θst is in the lane departure direction. In a case were the target steering angle θo relative to the actual steering angle θst is in the lane returning direction, i.e., the steering-increase direction (NO in step S28), the departure prevention control calculator 11c may determine that steering based on the steering assist torque is safer than steering intended by the steering-wheel operation performed by the driver, and exit the routine. Thereafter, the process may be caused to proceed to step S16 in FIG. 5.

In contrast, in a case where it is determined that the target steering angle θo relative to the actual steering angle θst is in the lane departure direction, i.e., the steering-decrease direction (YES in step S28), relatively large reaction force may be applied to the steering-wheel operation performed by the driver against the intention of the driver. To prevent such a situation, the process may be caused to proceed to step S29. In step S29, the departure prevention control calculator 11c may set the target steering angle θo in a direction (lane returning side) opposite to the lane departure direction, i.e., the steering-increase direction, from the actual steering angle θst by a predetermined angle. Thereafter, the process may be caused to proceed to step S16 in FIG. 5. Thus, in a case where the driver performs the steering-wheel operation in the steering-increase direction, it is possible to generate steering assist torque to actively assist the steering-wheel operation performed by the driver.

In step S16 in FIG. 5, the departure prevention control calculator 11c may supply a steering angle signal corresponding to the target steering angle θo to the steering-wheel-torque calculator 11d. Upon receiving the steering angle signal, the steering-wheel-torque calculator 11d may set the steering wheel torque (the control amount) corresponding to the steering angle signal, and transmit data of the set steering wheel torque to the EPS_ECU 8. The EPS_ECU 8 may drive the EPS motor 7 on the basis of the received data of the steering wheel torque to thereby generate predetermined steering assist torque.

Figure 9:
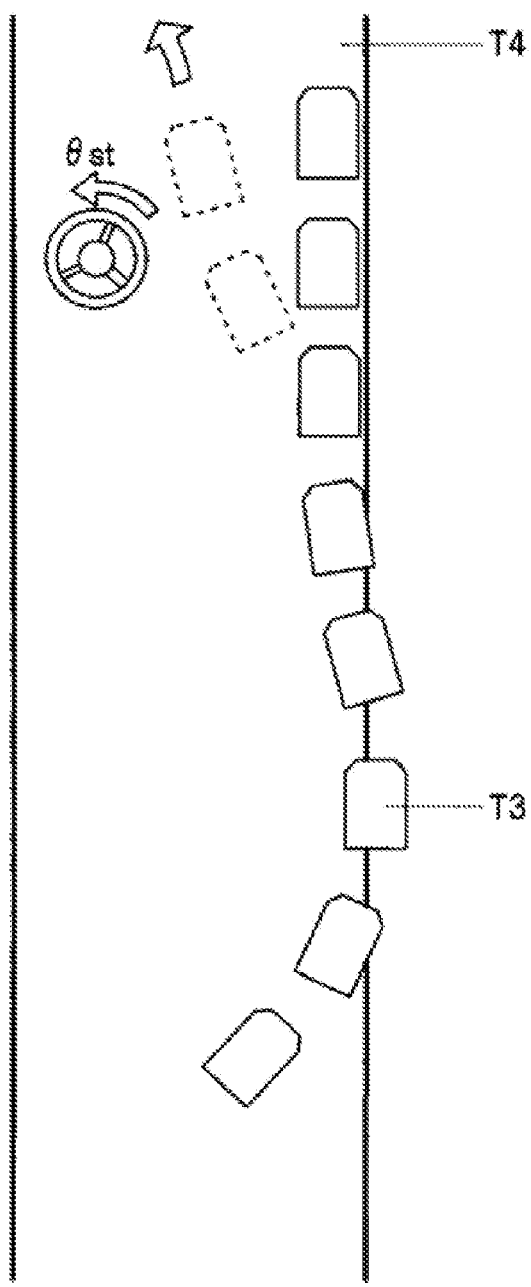
FIG. 9 is an explanatory diagram illustrating an example of a traveling path of an own vehicle in a case where a driver performs steering-wheel operation while the lane departure prevention control is being performed.

For example, as illustrated in FIG. 9, the driver may operate the steering wheel 4 in the lane returning direction in a section for which the departure prevention control calculator 11c sets the target steering angle θo for causing the own vehicle 1 to travel along the departure determination lateral position (see FIG. 7) (i.e., in the period from the elapsed time T3 to the elapsed time T4). In a case where the steering wheel torque Ts at this time is the override determination threshold Tso or greater (Ts≥Tso) and where the actual steering angle θst detected by the steering-angle sensor 15 is in the lane returning direction relative to the target steering angle θo, the departure prevention control calculator 11c may determine that the steering override that guides the own vehicle 1 in a safer direction is present.

As described above, according to the example embodiment, even in a case where the departure prevention control calculator 11c determines that the steering override that guides the own vehicle 1 in the lane returning direction is present, the lane departure control may not be ended but be continued. Accordingly, this helps to prevent re-departure, for example, in a case where the own vehicle 1 is traveling on a curved road.

Further, the departure prevention control calculator 11c may set the target steering angle θo in the lane returning direction (the steering-increase direction) by a predetermined angle from the actual steering angle θst. Accordingly, it is possible to generate steering assist torque that more actively assists the steering-wheel operation performed by the driver while continuing the lane departure prevention control. As a result, it is possible to allow the driver to perform smooth steering-wheel operation with no or less sense of discomfort.

The departure prevention control by the departure prevention control calculator 11c may be executed in accordance with the departure prevention control pattern. Therefore, in a case where the steering wheel torque Ts resulting from intervention in steering by the driver becomes less than the override determination threshold Tso (Ts<Tso) while the lane departure prevention control is continued, the departure prevention control calculator 11c may restart the departure prevention control based on the departure prevention control pattern.

Accordingly, in the section corresponding to the period from the elapsed time T3 to the elapsed time T4, the departure prevention control calculator 11c may restart the departure prevention control that causes the own vehicle 1 to travel along the departure determination lateral position illustrated in FIG. 7. On this occasion, in a case where it is determined that the predicted lateral movement amount is not beyond the departure determination lateral position in step S2 in FIG. 4 and where the departure prevention control flag Fc is cleared (Fc←0) in step S4, the departure prevention control calculator 11c may stop performing the lane departure prevention control.

The embodiment of the present technology is not limited to the example embodiment described above. For example, the LDP_ECU 11 may be applied to automatic driving.

According to an example embodiment of the technology, in a case where the presence of the steering override in a direction opposite to the lane departure direction is detected and the target steering angle is determined to be in the steering-decrease direction relative to the actual steering angle while the lane departure prevention control is being performed, the target steering angle may be set in a direction to actively assist the steering-wheel operation performed by the driver. It is therefore possible to allow the driver to perform smooth steering-wheel operation with no or less sense of discomfort.

Each of the EPS_ECU 8 and the LDP_ECU 11 illustrated in FIG. 1 and the lateral-position calculator 11a, the departure determination calculator 1ib, the departure prevention control calculator 11c, and the steering-wheel-torque calculator 11d illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the EPS_ECU 8 and the LDP_ECU 11 illustrated in FIG. 1 and the lateral-position calculator 11a, the departure determination calculator 11b, the departure prevention control calculator 11c, and the steering-wheel-torque calculator 11d illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the EPS_ECU and the LDP_ECU 11 illustrated in FIG. 1 and the lateral-position calculator 11a, the departure determination calculator 11b, the departure prevention control calculator 11c, and the steering-wheel-torque calculator 11d illustrated in FIG. 3.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane departure prevention control apparatus to be applied to a vehicle, the lane departure prevention control apparatus comprising:
  a traveling-environment recognition unit configured to recognize a traveling environment in front of the vehicle and detect, based on the recognized traveling environment, lane lines defining a left side and a right side of a lane on which the vehicle travels;
  a vehicle-behavior detector configured to detect behavior of the vehicle;
  a predicted departure determination unit configured to predict that the vehicle is to depart from the lane based on the detected lane lines and the detected behavior of the vehicle;
  a lane departure prevention control processor configured to:
    in response to predicting that the vehicle is to depart from the lane, 1) set a target steering angle being a steering angle with which departure of the vehicle from the lane is preventable, 2) detect, using a steering-angle detector, an actual steering angle of steering-wheel operation currently being performed by a driver of the vehicle, and 3) determine that the actual steering angle of the steering-wheel operation currently being performed by the driver is in a direction opposite a lane departing direction;
    in response to determining that the actual steering angle of the steering-wheel operation currently being performed by the driver is in the direction opposite the lane departing direction, determine, based on a difference between the actual steering angle and the target steering angle, whether the target steering angle is in the lane departing direction relative to the actual steering angle or the direction opposite the lane departing direction;
    when the target steering angle is in the lane departing direction relative to the actual steering angle, 1) update the set target steering angle to be further toward the direction opposite the lane departing direction and 2) execute a lane departure prevention control based on the updated target steering angle; and
    when the target steering angle is in the direction opposite the lane departing direction relative to the actual steering angle, 1) maintain the already set target steering angle and 2) execute the lane departure prevention control based on the maintained target steering angle.

2. The lane departure prevention control apparatus according to claim 1, wherein, when executing the lane departure prevention control based on the updated target steering angle, the lane departure prevention control processor is configured to update the target steering angle in the direction opposite the lane departing direction by a predetermined angle from the actual steering angle to assist the steering-wheel operation performed by the driver.

3. A lane departure prevention control apparatus to be applied to a vehicle, the lane departure prevention control apparatus comprising:
  a traveling-environment recognition unit configured to recognize a traveling environment in front of the vehicle and detect, based on a basis of the recognized traveling environment, lane lines defining a left side and a right side of a lane on which the vehicle travels;

a vehicle-behavior detector configured to detect behavior of the vehicle; and circuitry configured to:
  predict that the vehicle is to depart from the lane based on the detected lane lines and the detected behavior of the vehicle;
  in response to predicting that the vehicle is to depart from the lane, 1) a target steering angle being a steering angle with which departure of the vehicle from the lane is preventable, 2) detect, using a steering-angle detector, an actual steering angle of steering-wheel operation currently being performed by a driver of the vehicle, and 3) determine that the actual steering angle of the steering-wheel operation currently being performed by the driver is in a direction opposite a lane departing direction;
  in response to determining that the actual steering angle of the steering-wheel operation currently being performed by the driver is in the direction opposite the lane departing direction, determine, based on a difference between the actual steering angle and the target steering angle, whether the target steering angle is in a steering-increase direction or a steering-decrease direction relative to the actual steering angle;
  when the target steering angle is in the steering-increase direction relative to the actual steering angle, 1) update the set target steering angle to be further toward the direction opposite the lane departing direction and 2) execute a lane departure prevention control based on the updated target steering angle; and
  when the target steering angle is in the steering-decrease direction relative to the actual steering angle, 1) maintain the already set target steering angle and 2) execute the lane departure prevention control based on the maintained target steering angle.

* * * * *